(12) United States Patent
Chung

(10) Patent No.: US 9,635,096 B2
(45) Date of Patent: Apr. 25, 2017

(54) SELECTING A CONTENT ITEM BASED ON A VIEW PROFILE

(71) Applicant: Google Inc., Mountain View, CA (US)

(72) Inventor: Wook Jin Chung, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 360 days.

(21) Appl. No.: 14/091,284

(22) Filed: Nov. 26, 2013

(65) Prior Publication Data

US 2015/0149583 A1     May 28, 2015

(51) Int. Cl.
*G06F 15/16* (2006.01)
*H04L 29/08* (2006.01)
*G06F 17/30* (2006.01)

(52) U.S. Cl.
CPC ........ *H04L 67/10* (2013.01); *G06F 17/30029* (2013.01)

(58) Field of Classification Search
CPC .............. G06Q 30/02; G06F 17/30817; G06F 17/30029; H04L 67/10
See application file for complete search history.

(56) References Cited

U.S. PATENT DOCUMENTS

| | | | | |
|---|---|---|---|---|
| 7,756,967 B1 * | 7/2010 | Kembel | ............ | G06F 17/30899 709/203 |
| 8,799,500 B2 * | 8/2014 | Georgis | ............. | H04L 29/0845 709/219 |
| 9,066,122 B1 * | 6/2015 | Rattazzi | ............. | H04N 21/2668 |
| 9,143,555 B1 * | 9/2015 | Chung | ................ | G06F 17/3089 |
| 2008/0066107 A1 * | 3/2008 | Moonka | ............ | G06F 17/30796 725/42 |
| 2008/0114639 A1 | 5/2008 | Meek et al. | | |
| 2009/0097822 A1 * | 4/2009 | Hirata | ............... | G06F 17/30817 386/262 |
| 2010/0042421 A1 * | 2/2010 | Bai | ........................ | G06Q 30/02 705/14.71 |

(Continued)

FOREIGN PATENT DOCUMENTS

| EP | 2 565 838 | 3/2013 |
|---|---|---|
| WO | WO-00/73916 | 12/2000 |

OTHER PUBLICATIONS

International Search Report & Written Opinion on PCT/US2014/060598 dated Jan. 30, 2015.

(Continued)

*Primary Examiner* — Krisna Lim
(74) *Attorney, Agent, or Firm* — Foley & Lardner LLP; John D. Lanza

(57) ABSTRACT

Users consume media in a variety of ways. Media may be consumed primarily for the audio, primarily for the video, or for a combination of the audio and the video. The selection and serving of a content item may be performed such that a content item profile of the served content item that matches how the media is being consumed may be preferred during selection by a content selection service. The selection of a content item by the content selection service may be based on an aggregate view profile for the media and a content item profile for a candidate content item. In some instances, a current view profile may also be used. The selected content item may be served to effect presentation of the selected content item with the media.

18 Claims, 5 Drawing Sheets

(56) References Cited

U.S. PATENT DOCUMENTS

| | | | |
|---|---|---|---|
| 2010/0095317 A1* | 4/2010 | Toebes | H04N 7/163 725/9 |
| 2010/0281364 A1* | 11/2010 | Sidman | G06F 17/30595 715/713 |
| 2011/0161409 A1* | 6/2011 | Nair | G06F 8/38 709/203 |
| 2012/0227064 A1 | 9/2012 | Neill | |
| 2012/0324494 A1* | 12/2012 | Burger | H04H 60/33 725/12 |
| 2013/0325869 A1* | 12/2013 | Reiley | G06F 17/3002 707/741 |
| 2014/0075463 A1* | 3/2014 | Kamdar | H04N 21/25891 725/9 |
| 2014/0379710 A1* | 12/2014 | Kritt | G11B 27/105 707/736 |
| 2015/0033292 A1* | 1/2015 | Nguyen | H04L 63/08 726/4 |
| 2015/0046941 A1* | 2/2015 | Tanabe | H04N 21/435 725/32 |

OTHER PUBLICATIONS

International Preliminary Report on Patentability on PCT/US2014/060598 dated Jun. 9, 2016.

* cited by examiner

SELECTING A CONTENT ITEM BASED ON A VIEW PROFILE

BACKGROUND

In a networked environment, such as the Internet or other networks, first-party content providers can provide information for public presentation on resources, for example web pages, documents, applications, and/or other resources. The first-party content can include text, video, and/or audio information provided by the first-party content providers via, for example, a resource server for presentation on a client device over the Internet. Additionally, third-party content items can also be provided by third-party content item providers for presentation on the client device together with the first-party content provided by the first-party content providers. Thus, a person viewing a resource can access the first-party content that is the subject of the resource, as well as the content item that may or may not be related to the subject matter of the resource. In some instances, a content item (e.g., an advertisement) may be presented with media, such as a visual presentation, an audio presentation, or an audio-visual presentation, to a user of a client device.

SUMMARY

One implementation disclosed herein is a method to serve a content item based on a view profile. The method includes receiving a request for a content item from a client device. The method also includes determining an aggregate view profile for a first media. The aggregate view profile may be based, at least in part, on aggregated values indicative of a ratio of audio and video. Each value may be based on a previously received view profile. The method includes receiving a content item profile for a content item. The method further includes comparing the aggregate view profile and the content item profile. The method includes serving the content item responsive to the request from the client device based, at least in part, on the comparison of the aggregate view profile and the content item profile.

Another implementation disclosed herein is a system including one or more processors and a storage device storing instructions that, when executed by the one or more processors, cause the one or more processors to perform several operations. The operations include receiving a request for a content item from a client device. The operations also include receiving an aggregate view profile for a first media. The operations further include determining a current view profile of the client device for the first media. The operations still further include receiving a plurality of content item profiles for a plurality of candidate content items. The operations include selecting a candidate content item of the plurality of candidate content items based, at least in part, on the received aggregate view profile, the determined current view profile, and the plurality of content item profiles. The operations also include serving, responsive to the request from the client device, the selected candidate content item.

An implementation disclosed herein is a computer-readable storage medium having machine instructions stored therein that, when executed by one or more processors, cause the one or more processors to perform several operations. The operations include receiving a current view profile of a client device for a first media and receiving a first aggregate view profile for the first media. The operations further include determining a modifier based, at least in part, on the current view profile and the aggregate view profile. The operations still further include modifying a quality score of a content item based, at least in part, on the modifier and a content item profile associated with the content item. The operations also include serving the content item responsive to a request from the client device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
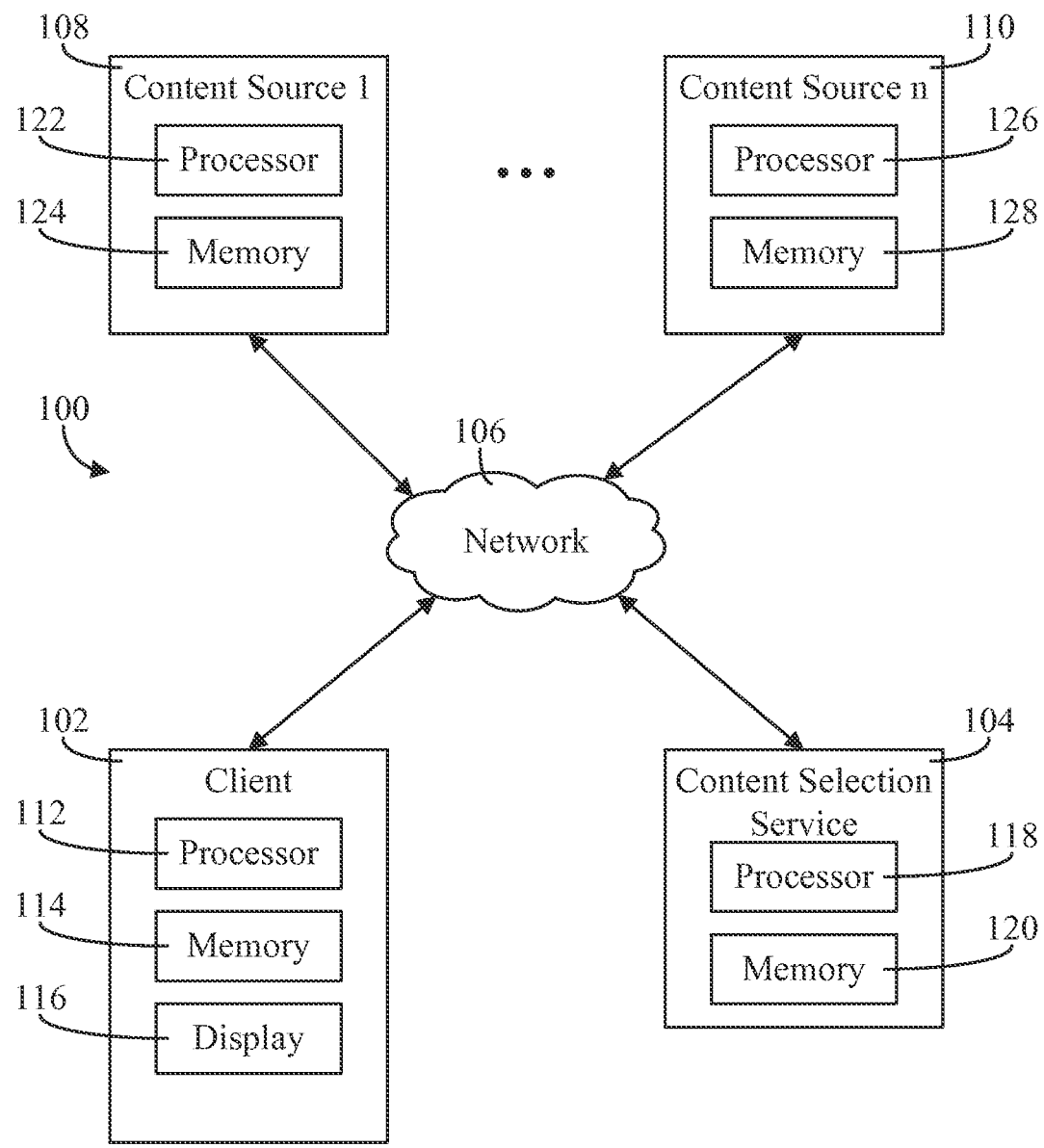
FIG. 1 is a block diagram of a computer system in which a content item is selected for presentation with first-party content, according to an implementation.

In a general overview, a content item (e.g., an advertisement) may be displayed along with media to a user. In some instances, the media may be presented in an audio-visual format even if the media is primarily audio, primarily video, or some combination thereof. A hosting or sharing site is a popular method to consume media and present content items while consuming the media. However, media may be uploaded to share just the audio (e.g., a newly released song or speech) or just to show images or video (e.g., slideshows).

For media that is audio-centric (e.g., a new released song), a user may simply play the media to listen to the audio portion and may ignore any video or other imagery being presented. For example, the user may leave a client device upon which the media is presented, such as a phone, tablet, PC, etc., alone with the volume turned up, but the user is not watching the screen or images. Accordingly, serving an audio-visual content item before, after, or during the playback of the media may be less effective as the user will may only hear the audio of the served content item without the images presented. Similarly, serving a visual-centric content item before, after, or during the playback of the media may be less effective as the user may not even view the video or images of the served content item.

Similarly, for media that is video-centric (e.g., a slideshow of mountain scenery), the user may view the media without regard to the audio. This means that the user may be purposefully mute any audio (e.g., if watching a video in class or presenting a slideshow) or may not care if the audio is muted or speakers are not connected. Accordingly, serving an audio-visual content item before, after, or during the playback of the media may be less effective as the user will may only see the video or images of the served content item without the audio presented. Similarly, serving an audio-centric content item before, after, or during the playback of the media may be less effective as the user may not even hear the audio of the served content item or the audio may be disruptive (e.g., having an audio content item interrupt a presentation).

Accordingly, it may be useful to determine a profile for the media item such that a content item similar to the profile for the media item may be served with the presentation of the media item. In some implementations, such a profile may be determined via analysis of the video content (e.g., frame-by-frame analysis or the like) and/or via analysis of the audio content (e.g., audio track analysis or the like). However, such analysis may not necessarily align with how users consume the media, especially as such consumption may evolve over time. For example, a user may only watch a music video once but may play it over and over for the music, without regard to the video.

Thus, a profile based on how one or more users interact with media may be used to provide a relevant content item to the user. For example, if users consume the media in a certain manner, then a content item may be selected and served to a user based, at least in part, on how well a profile of the content item matches the profile of how users consume the media. For example, users may generally only consume the audio component of the media, and, therefore, the served content item should be an audio-centric content item.

In some implementations, a current view profile may be determined for how each user is currently interacting with the media. The current view profile may be used to determine a content item to serve to a user, either alone or in combination with an aggregate view profile for the media, which is generated based on how one or more users previously interacted with the media.

Referring to FIG. 1, a block diagram of a system 100 in accordance with a described implementation is shown. System 100 includes a client device 102 which communicates with other computing devices via a network 106. Client device 102 may execute a web browser or other application (e.g., a video game, a messenger program, a media player, a social networking application, etc.) to retrieve a resource having content from other devices over network 106. For example, client device 102 may communicate with any number of content sources 108, 110 (e.g., a first content source through nth content source). Content sources 108, 110 may provide resource data (e.g., webpage data) and/or other data to present content, such as images, video, and audio, to client device 102. System 100 may also include a content selection service 104 configured to select a content item to be provided to client device 102. For example, content source 108 may provide a first-party webpage to client device 102 that includes additional content items selected by content selection service 104.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT6 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). In some implementations, the type of client device 102 may be categorized as being a mobile device, a desktop device (e.g., a device intended to remain stationary or configured to primarily access network 106 via a local area network), or another category of electronic devices (e.g., tablet devices may be a third category, etc.). Client device 102 is shown to include a processor 112 and a memory 114, i.e., a processing circuit. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, Java, JavaScript, Perl, HTML, XML, Python and Visual Basic.

Client device 102 may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, resource data (e.g., webpage data), a text file, a spreadsheet, images, search results, other forms of electronic documents, and applications executable by client device 102. For example, content source 108 may be an online search engine that provides search result data to client device 102 in response to a search query. In another example, content source 110 may be a first-party web server that provides webpage data to client device 102 in response to a request for the webpage. Similar to client device 102, content sources 108, 110 may include processors 122, 126 and memories 124, 128, respectively, that store program instructions executable by processors 122, 126. For example, the processing circuit of content source 108 may include instructions such as web server software, FTP serving software, and other types of software that cause content source 108 to provide content via network 106.

According to various implementations, any of content sources 108, 110 may provide first-party resource data to client device 102 that includes one or more content item tags. In general, a content item tag refers to any piece of webpage code associated with the action of including a content item with a first-party webpage. For example, a content item tag may define a content item slot on a webpage for a content item, a slot for out of page a content item (e.g., an interstitial slot), whether a content item should be loaded asynchronously or synchronously, whether the loading of the content item should be disabled on the webpage, whether the content item that loaded unsuccessfully should be refreshed, the network location of a content source that provides the content item (e.g., content sources 108, 110, content selection service 104, etc.), a network location (e.g., a URL) associated with clicking on the content item, how the content item is to be rendered on a display, a command that causes client device 102 to set a browser cookie (e.g., via a pixel tag that sets a cookie via an image request), one or more keywords used to retrieve the content item, and other functions associated with providing a content item with a first-party webpage. For example, content source 108 may serve first-party webpage data to client device 102 that causes client device 102 to retrieve a content item from content selection service 104. In another implementation, content may be selected by content selection service 104 and provided by content source 108 as part of the first-party webpage data sent to client device 102. In a further example, content selection service 104 may cause client device 102 to retrieve a content item from a specified location, such as memory 114 or content sources 108, 110.

Content selection service 104 may also be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processing circuit including a processor 118 and a memory 120 that stores program instructions executable by processor 118. In cases in which content selection service 104 is a combination of computing devices, processor 118 may represent the collective processors of the devices and memory 120 may represent the collective memories of the devices.

Content selection service 104 may be configured to select a content item for client device 102. In an implementation, the selected content item may be provided by content selection service 104 to client device 102 via network 106. For example, content source 110 may upload the content item to content selection service 104. Content selection service 104 may then provide the content item to client device 102 to be presented in conjunction with first-party content provided by any of content sources 108, 110. In other implementations, content selection service 104 may provide an instruction to client device 102 that causes client device 102 to retrieve the selected content item (e.g., from memory 114 of client device 102, from content source 110, etc.). For example, content selection service 104 may select a content item to be provided as part of a first-party webpage being visited by client device 102 or within a first-party application being executed by client device 102 (e.g., within a game, messenger application, etc.).

In some implementations, content selection service 104 may be configured to select content based on a device identifier associated with client device 102. In general, a device identifier refers to any form of data that may be used to represent a device or software that receives content selected by content selection service 104. In some implementations, a device identifier may be associated with one or more other device identifiers (e.g., a device identifier for a mobile device, a device identifier for a home computer, etc.). Device identifiers may include, but are not limited to, cookies, device serial numbers, user profile data, or network addresses. For example, a cookie set on client device 102 may be used to identify client device 102 to content selection service 104.

For situations in which the systems discussed herein collect personal information about a user, or may make use of personal information, the user may be provided with an opportunity to control which programs or features collect such information, the types of information that may be collected (e.g., information about a user's social network, social actions or activities, a user's preferences, a user's current location, etc.), and/or how a content item may be selected by content selection service 104 and presented to the user. Certain data, such as a device identifier, may be anonymized in one or more ways before it is stored or used, so that personally identifiable information is removed when generating parameters (e.g., demographic parameters) used by content selection service 104 to select a content item. For example, a device identifier for client device 102 may be anonymized so that no personally identifiable information about its corresponding user can be determined by content selection service 104 from it. In another example, a user's geographic location may be generalized where location information is obtained (such as to a city, ZIP code, or state level), so that a precise location of the user cannot be determined. Thus, the user of client device 102 may have control over how information is collected about him or her and used by content selection service 104.

If the user of client device 102 has elected to allow content selection service 104 to use information regarding him or her, content selection service 104 may use history data associated with a device identifier to select relevant content for the corresponding user. History data may be any data associated with a device identifier that is indicative of an online event (e.g., visiting a webpage, interacting with presented content, conducting a search, making a purchase, downloading content, etc.). Based in part on the analyzed history data, content selection service 104 may select a content item to be provided in conjunction with first-party content (e.g., as part of a displayed webpage, as a pop-up, within a video game, within another type of application, etc.). Additional data associated with a device identifier may include, but is not limited to, the device type of client device 102 (e.g., whether client device 102 is a desktop or mobile device), the location of client device 102, or a search query generated by client device 102. For example, content selection service 104 may select a content item to be provided as part of a first-party webpage or in conjunction with search results from one of content sources 108, 110.

Content selection service 104 may analyze the history data associated with a device identifier to identify one or more topics that may be of interest. For example, content selection service 104 may perform text and/or image analysis on a webpage from content source 108, to determine one or more topics of the webpage. In some implementations, a topic may correspond to a predefined interest category used by content selection service 104. For example, a webpage devoted to the topic of golf may be classified under the interest category of sports. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category. Similarly, content selection service 104 may analyze the content of a first-party webpage accessed by client device 102 to identify one or more topical categories for the webpage. For example, content selection service 104 may use text or image recognition on the webpage to determine that the webpage is devoted to the topical category of /Sports/Golf.

Content selection service 104 may receive history data indicative of one or more online events associated with a device identifier. In implementations in which a content tag causes client device 102 to request content from content selection service 104, such a request may include a device identifier for client device 102 and/or additional information (e.g., the webpage being loaded, the referring webpage, etc.). For example, content selection service 104 may receive and store history data regarding whether or not a content item provided to client device 102 was selected using an interface device (e.g., the user of client device 102 clicked on a third-party hyperlink, third-party image, etc.). Content selection service 104 may store such data to record a history of online events associated with a device identifier. In some cases, client device 102 may provide history data to content selection service 104 without first executing a content tag. For example, client device 102 may periodically send history data to content selection service 104 or may do so in response to receiving a command from a user interface device. In some implementations, content selection service 104 may receive history data from content sources 108, 110. For example, content source 108 may store history data regarding web transactions with client device 102 and provide the history data to content selection service 104.

Content selection service 104 may apply one or more weightings to an interest or product category, to determine whether the category is to be associated with a device identifier. For example, content selection service 104 may impose a maximum limit to the number of product or interest categories associated with a device identifier. The top n-number of categories having the highest weightings may then be selected by content selection service 104 to be associated with a particular device identifier. A category weighting may be based on, for example, the number of webpages visited by the device identifier regarding the category, when the visits occurred, how often the topic of the category was mentioned on a visited webpage, or any online actions performed by the device identifier regarding the category. For example, topics of more recently visited webpages may receive a higher weighting than webpages that were visited further in the past. Categories may also be subdivided by the time periods in which the webpage visits occurred. For example, the interest or product categories may be subdivided into long-term, short-term, and current categories, based on when the device identifier visited a webpage regarding the category.

Content selection service 104 may be configured to conduct a content auction among content item providers to determine which content item is to be provided to client device 102. For example, content selection service 104 may conduct a real-time content auction in response to client device 102 requesting first-party content from one of content sources 108, 110 or executing a first-party application. Content selection service 104 may use any number of factors to determine the winner of the auction. For example, the winner of a content auction may be based in part on the third-party provider's bid and/or a quality score for the third-party provider's content (e.g., a measure of how likely the user of client device 102 is to click on the content). In other words, the highest bidder is not necessarily the winner of a content auction conducted by content selection service 104, in some implementations.

Content selection service 104 may be configured to allow content item providers to create campaigns to control how and when the provider participates in content auctions. A campaign may include any number of bid-related parameters, such as a minimum bid amount, a maximum bid amount, a target bid amount, or one or more budget amounts (e.g., a daily budget, a weekly budget, a total budget, etc.). In some cases, a bid amount may correspond to the amount the third-party provider is willing to pay in exchange for their content being presented at client device 102. In other words, the bid amount may be on a cost per impression or cost per thousand impressions (CPM) basis. In further cases, a bid amount may correspond to a specified action being performed in response to the content item being presented at a client device. For example, a bid amount may be a monetary amount that the content item provider is willing to pay, should their content be clicked on at the client device, thereby redirecting the client device to the provider's webpage. In other words, a bid amount may be a cost per click (CPC) bid amount. In another example, the bid amount may correspond to an action being performed on the third-party provider's website, such as the user of client device 102 making a purchase. Such bids are typically referred to as being on a cost per acquisition (CPA) or cost per conversion basis.

A campaign or other grouping of content items created via content selection service 104 may also include selection parameters that control when a bid is placed on behalf of a content item provider in a content auction. Any specified content selection parameters may be stored as part of the account of the provider. If the content item is to be presented in conjunction with search results from a search engine, for example, the content selection parameters may include one or more sets of search keywords. For example, the content item provider may only participate in content auctions in which a search query for "golf resorts in California" is sent to a search engine. Other content selection parameters that control when a bid is placed on behalf of a content item provider may include, but are not limited to, a topic identified using a device identifier's history data (e.g., based on webpages visited by the device identifier), the topic of a webpage or other first-party content with which the content item is to be presented, a geographic location of the client device that will be presenting the content (e.g., a zip code, city, state, country, etc.), a geographic location specified as part of a search query, or a device type (e.g., mobile devices, desktop devices, tablet devices, etc.). In some cases, a selection parameter may designate a specific webpage, website, or group of websites with which the content item is to be presented. For example, an advertiser selling golf equipment may specify that they wish to place an advertisement on the sports page of an particular online newspaper.

Content selection service 104 may be configured to apportion a percentage of earnings from a content item provider to the provider of the first-party content with which the content item is presented. For example, content selection service 104 may apportion 40% of the revenues received from a content item provider to the operator of content source 108 whenever the content item is selected for presentation on a website from content source 108. Thus, a first-party content provider may receive revenues in exchange for allowing content items to be provided with the provider's content. Revenues apportioned to a first-party content provider by content selection service 104 may be based on the number of times a content item was provided to devices (e.g., based on a number of impressions), based on whether or not a user clicked on the content item (e.g., a click count), or based on any other performance metric.

An account of a first-party content provider in content selection service 104 may also include any number of content selection parameters that control which content items are eligible for presentation with the content from the first-party provider. For example, a first-party content provider may specify to content selection service 104 the topics of content items eligible for selection for the provider's content. Another content selection parameter may control whether content item to appear with the provider's content may be selected based on an interest category (e.g., the content item may be unrelated to the topic of the first-party content, but determined to be of relevance to a particular user). Other content selection parameters may allow or prevent content from specific content item providers, specific web addresses, specific websites, or the like.

Content selection service 104 may be configured to determine performance metrics for a content provider. In an implementation, performance metrics may correspond to revenues earned by a first-party content provider. In another implementation, performance metrics may correspond to how users responded to content items selected by content selection service 104. For example, content selection service 104 may determine an impression count (e.g., how many times a content item was presented), a click count (e.g., how many times the presented content item was clicked), a conversion count (e.g., how many times the clicked content item led to a sale or other desired online action), a click through rate (CTR), or a conversion rate (CVR). In some implementations, performance metrics determined by content selection service 104 may be subdivided according to any number of different traffic characteristics. Potential traffic characteristics for the performance metrics may include, but are not limited to, the geographic locations of devices accessing the content, the types of devices accessing the content (e.g., mobile devices, tablet devices, desktop devices, etc.), the particular configuration of the devices accessing the content (e.g., operating systems, hardware settings, etc.), interest categories used to select the content item, the times in which the content is accessed (e.g., broken down by minute, hour, day, week, month, etc.), predicted information about the users accessing the content, combinations thereof, or the like.

In some implementations, content selection service 104 may be configured to monitor the performance metrics of a content provider across any number of different traffic characteristics or other classifications used to subdivide the performance metrics. For example, content selection service 104 may monitor the revenues earned by a first-party content provider broken down by the different device types that access content from the provider (e.g., revenues for mobile devices, revenues for desktop devices, etc.). In an implementation, content selection service 104 may detect a change in the relationships between the subdivided performance metrics. For example, content selection service 104 may determine that the revenues of the provider attributable to devices located in the United States have overtaken the revenues of the provider attributable to devices located in India. In some implementations, content selection service 104 may predict whether a change in performance metrics across one or more traffic characteristics will continue. For example, content selection service 104 may determine whether a shift in the provider's revenues is likely to continue or is a temporary shift. Content selection service 104 may also generate and provide a notification to a content provider if a shift is detected in the performance metrics of the provider. For example, content selection service 104 may provide a notification to a device of a content provider indicating that mobile revenues have surpassed desktop revenues and that the trend is predicted to continue. Such a notification may be used by the content provider to tailor the provider's content accordingly or on a purely informational basis. For example, a first-party content provider may optimize his or her website for mobile devices if the provider's revenues have shifted towards an emphasis on mobile devices.

In an implementation, content selection service 104 may generate a notification based on an action or event associated with a content provider. An action or event triggering the monitoring of performance metrics by content selection service 104 may include changes made to the provider's account (e.g., by changing content selection parameters in the provider's account), changes made to the provider's content (e.g., by redesigning the provider's website), or the like. Content selection service 104 may monitor any performance metric changes subsequent to the action or event in response to a request from the provider to do so (e.g., the provider elects to receive notifications) or automatically in response to the action or event. If a change in the provider's performance metrics is detected and attributable to the triggering action or event, content selection service 104 may generate and provide a notification to the provider regarding the performance change. For example, content selection service 104 may generate a notification for a first-party content provider indicating that the provider's revenues have dropped by a certain amount or percentage as a result of the provider blocking certain types of content items from appearing on the provider's website.

Figure 2:
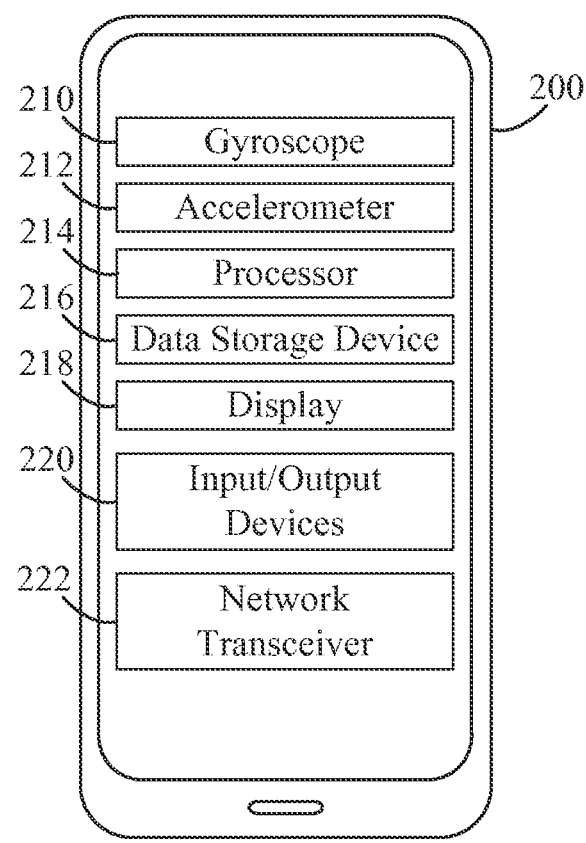
FIG. 2 is a block diagram of an example mobile device having several sensors, according to an implementation.

FIG. 2 is a block diagram of an example mobile device 200 having several sensors, according to an implementation. The mobile device 200, which may be a client device 102 of FIG. 1, includes several sensors 210, 212, a processor 214, a data storage device 216, a display 218, input/output devices 220, and a network transceiver 222. The mobile device 200 include a smartphone, a cellular telephone, a tablet, a laptop, a portable media device, a wearable display or glasses, and/or any other portable electronic device. The mobile device 200 may include a bus or other communication component for communicating information between the various components of the mobile device 200. The processor 214 may be coupled to the bus and/or otherwise for processing information, data, and/or instructions from one or more components of the mobile device 200. The data storage device 216 may include dynamic storage devices, such as a RAM or other dynamic storage devices, and may be coupled to the bus and/or otherwise for storing information, data, and/or instructions to be executed by the processor 214. The data storage device 216 can also be used for storing position information, temporary variables, and/or other intermediate information during execution of instructions by the processor 214. In some instances, the data storage device 216 may include a static storage device, in addition to or instead of the dynamic storage device, such as ROM, solid state drive (SSD), flash memory (e.g., EEPROM, EPROM, etc.), magnetic disc, optical disc, etc., that is coupled to the bus and/or otherwise for storing static information, data, and/or instructions for the processor 230.

The display 218 may be coupled via the bus and/or otherwise to other components of the mobile device 200. The display may include a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. The input/output devices 220 may include devices such as a keyboard having alphanumeric and other keys, a microphone, a speaker, an LED, a trackball, a mouse, cursor direction keys, etc. that may be coupled to the bus for communicating information and/or command selections to the processor 214. In another implementation, an input device may be integrated with the display 218, such as in a touch screen display.

The network transceiver 222 may be configured to interface with a network, such as network 106 of FIG. 1. Examples of such a network may include the Internet, local, wide, metro or other area networks, intranets, voice or data mobile device communication networks, and/or other networks. In one example, the network transceiver 222 may include voice and/or data mobile device communication network through which the mobile device 200 may communicate with remote devices, such as a third-party content item server, a content source 108, 110, and/or content selection service 104 of FIG. 1. The voice and/or data mobile device communication network may include those operating under the standards of GSM, EDGE, GPRS, CDMA, UMTS, WCDMA, HSPA, HSPA+, LTE, and/or other mobile device network standards. In some implementations, the network transceiver 222 may include other network transceivers, such as a WiFi™ transceiver, a Bluetooth® transceiver, a cellular transceiver, an NFC transceiver, etc. In still further implementations, the mobile device 200 may include several network transceivers 222, such that the mobile device 200 may communicate with several networks. Of course, other network transceivers 222 for the mobile device 200 to communicate with remote devices may be used as well.

According to various implementations, the processor 214 may execute an arrangement of instructions contained in the data storage device 216. Such instructions can be read into the data storage device 216 from another computer-readable medium. Execution of the arrangement of instructions contained in the data storage device 216 may cause the mobile device 200 to perform various operations, such as reading data output from one or more sensors 210, 212, transmitting data to a remote device via the network transceiver 222, displaying information on the display 218, and/or otherwise. One or more processors in a multi-processing arrangement may also be employed to execute the instructions contained in the data storage device 216. In alternative implementations, hard-wired circuitry may be used in place of or in combination with software instructions to effect the various operations. Thus, implementations are not limited to any specific combination of hardware circuitry and software. Of course, other configurations or components for mobile device 200 may be included.

The several sensors of the mobile device 200 may include a gyroscope 210 and an accelerometer 212. In some implementations, other sensors may be included as well, such as a magnetometer, a barometer, a proximity sensor, a temperature sensor, a light sensor, a humidity sensor, an acoustic sensor, and/or other sensors. Of course mobile device 200 may have other features, components, etc. as well.

The gyroscope 210 may be communicatively coupled to the processor 214, the data storage device 216, the display 218, the input/output devices 220, the network transceiver 222, and/or other components of the mobile device 200. The gyroscope 210 may include a microelectromechanical system (MEMS) gyroscope, a vibrating structure gyroscope (VSG) (e.g., a tuning fork gyroscope), and/or any other gyroscope. The gyroscope 210 may be configured measure the rate of rotation of the mobile device 200 about one, two, and/or three axes and/or the degrees of rotation relative to one, two, and/or three axes. The values of the rates of rotation and/or the values of the degrees of rotation may be output to the processor 214, the data storage device 216, the network transceiver 222, and/or any other component of the mobile device 200.

The accelerometer 212 may be communicatively coupled to the processor 214, the data storage device 216, the display 218, the input/output devices 220, the network transceiver 222, and/or other components of the mobile device 200. The accelerometer 212 may include a MEMS accelerometer, a piezoelectric accelerometer, and/or any other accelerometer. The accelerometer 212 may be configured measure the acceleration of the mobile device 200 in one, two, and/or three axes and/or the direction of gravity relative to one, two, and/or three axes. The values of the accelerations and/or the values of the force of gravity for the one, two, and/or three axes may be output to the processor 214, the data storage device 216, the network transceiver 222, and/or any other component of the mobile device 200.

While the foregoing describes some examples of sensors that may be included in a mobile device 200, still other sensors may be included as well, such as atmospheric sensors, fluid velocity sensors, force sensors, etc.

In some implementations, the values from the sensors 210, 212 may be read and transmitted via the network transceiver 222 in response to receiving data via the network transceiver 222. For example, a mobile device 200 may request a resource, such as a mobile webpage, by sending the request for data for the resource to a content source, such as content source 108, 110, via the network transceiver 222. The content source may receive the request and transmit data to effect presentation of the resource having the content on the display 218 of the mobile device 200. The data for the resource may include one or more content item slots for displaying one or more content items, such as advertisements, when the resource is presented for display by the mobile device 200. In some implementations, the data for the requested resource may include code or piece of code, such as a JavaScript® script, that may cause the processor 214 of the mobile device 200 to read one or more values from one or more sensors of the mobile device 200 and transmit the one or more values to a remote device, such as content selection service 104, via the network transceiver 222. By way of example, the one or more values from the one or more sensors of the mobile device 200 may be appended to a content item request URL (e.g., //contentitem.item/page/contentitem?party=abc123&sensor1=5&sensor2=7&sensor3=45 or //contentitem.item/page/contentitem?party=abc123&devicestate=98765). Thus, one or more of the several sensors of the mobile device 200 may have the current values read and transmitted to a content selection service. Such values may be used by the content selection service to determine a current view profile of the mobile device 200. In other implementations, the values may be used to modify or generate an aggregate view profile. As will be described in greater detail herein, such view profiles may be used to select a content item to be served with the requested resource. In other implementations, the sensor values may be used to generate the current view profile by the processor 214 of the mobile device 200. That is, for example, a script may be sent to the mobile device 200 that receives the sensor values as input (amongst other inputs) and outputs a numerical value, e.g., 0.6, for a current view profile that is indicative of a probable ratio of audio and video for the current view profile. The current view profile and aggregate view profile will be described in greater detail below in reference to FIGS. 4-6.

Figure 3:
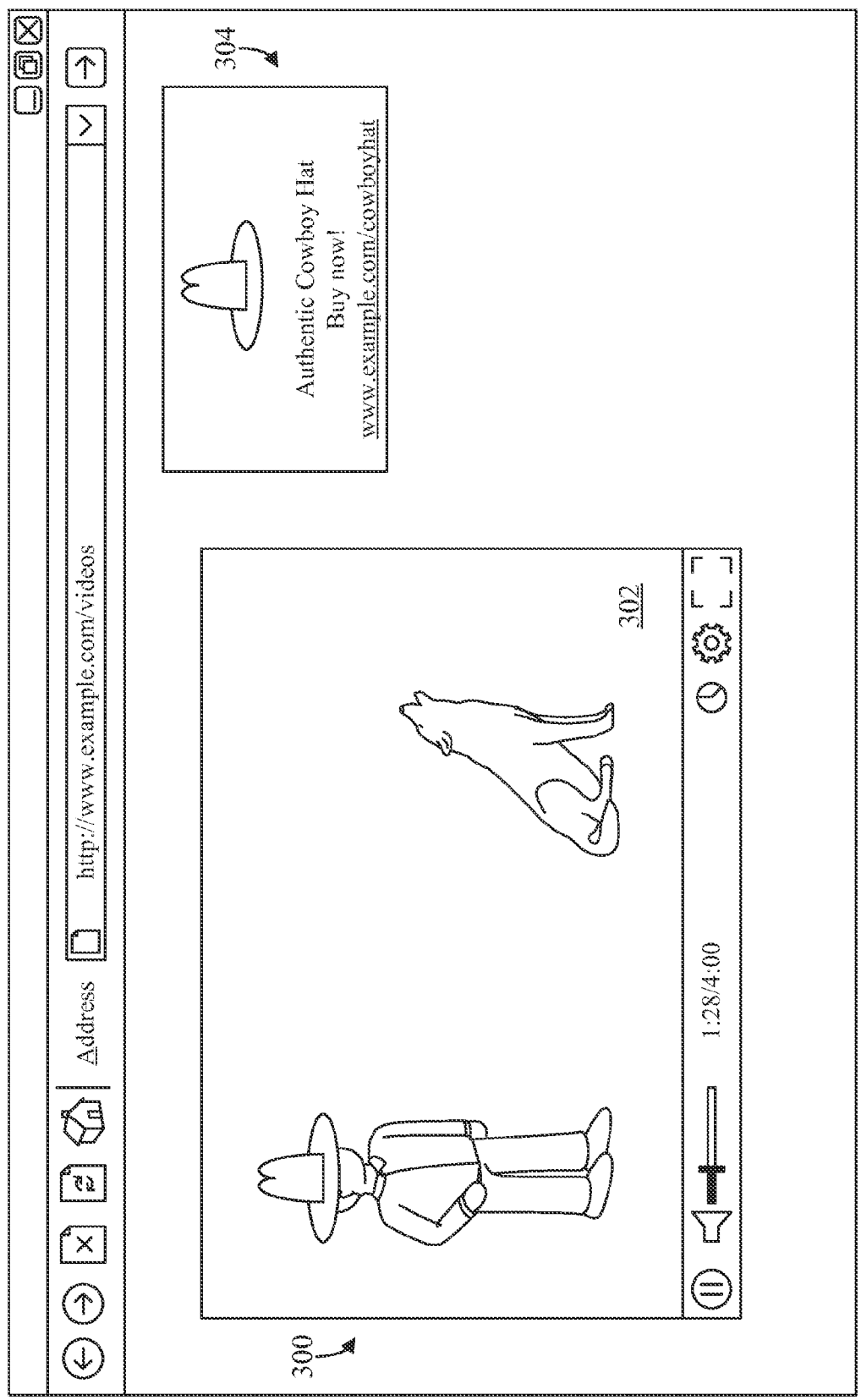
FIG. 3 is an illustration of an example web page that displays media along with a content item, according to an implementation.

FIG. 3 is an illustration of an example resource 300, such as a webpage, that may be provided for display on a display of a client device, such as client device 102 of FIG. 1 or mobile device 200 of FIG. 2. The resource 300 includes media content 302 displayed along with a content item 304. The media 302 may be an audio-visual presentation, such as a music video, a television show, etc., an audio-centric or audio-only presentation, such as a song or speech without images or video, and/or a video-centric or video-only presentation, such as a slideshow. The resource 300 also includes a slot for a content item 304 to be displayed to a user before, after, or during the presentation of the media 302. The content item 304 may be an audio-visual content item (e.g., a Flash® video or other media content), an image-only content item, or an audio-only content item, such as an audio file in the form of a song, a jingle, and so forth. The content item 304 may include text, graphics, multimedia content, programming elements (HTML, flash, scripts, etc.), and any other appropriate format.

A web browser executing on a client device may data to effect presentation of the resource 300 and media 302. The content source for the resource 300 and/or the client device sends a content item request to a content selection service, such as content selection service 104 of FIG. 1. The content selection service selects a content item to be served to the client device and displayed in the content item slot of the resource 300. In some implementations, a content item provider, e.g., a hat dealer, may bid on keywords, such as "hat," such that a content item of the content item provider is served with content related to the keyword, such as media associated with hats. Thus, the content item 304 which relates to hats, may be presented when a request is received and indicates that the request is associated with the keyword "hat." In some implementations, the media 302 may include one or more tags that may be used as keywords. For example, the media 302 of FIG. 3 may be tagged with the keyword "hat" by a publisher, an owner of the video content, another user, etc. When the request for a content item is sent to the content selection service, the request may include data indicative of the keyword "hat" such that content items responsive to the keyword "hat" may be selected by the content selection service. Data to effect presentation of the selected content item 304 may be received by the client device such that a web browser executing on the client device displays the content item 304 in the content item slot of the resource 300 along with the media 302. In some implementations, such as audio-visual content items, the content item 304 may be played for a predetermined amount of time and then muted or playback may be stopped.

If more than one content item 304 may be eligible to be presented with media 302, then the content selection service may identify one or more content items 304 based on an auction of the candidate content items. The content selection service may be configured to conduct a content auction among content item providers to determine which candidate content item is to be provided. For example, the content selection service may conduct a real-time content item auction in response to a request for a content item. The content selection service may use any number of factors to determine the winner of the auction. For example, the winner of a content auction may be based in part on the third-party provider's bid and/or a quality score for the third-party provider's content (e.g., a value that may be based on a measure of how likely a user viewing the content item is to click on the content item, a measure of how closely related the content item is to the content of the resource 300 (e.g., media 302), etc.). In other words, the highest bidder is not necessarily the winner of a content auction conducted by content selection service, in some implementations.

For example, the winner of a content item auction may be the content item having the highest value when a bid for the content item is multiplied by a quality score for the content item. That is, the content selection service may generate values for each candidate content item of several candidate content items using an equation, such as Value=Bid*QualityScore. The candidate content item with the highest value may then be selected and data to effect presentation of the selected candidate content item may be transmitted to the client device to effect presentation of the content item, such as content item 304, with the resource 300. In some implementations, the content selection service may utilize a variety of factors during the content item auction that may affect the quality score. As will be described in greater detail herein, a current view profile, an aggregate view profile for media 302, and/or a content item profile for the content item 304 may be utilized to modify the quality score, thereby influencing which content item of several candidate content items is selected during the auction performed by the content selection service.

In some implementations, the content item provider associated with the content item 304 or the entity hosting the resource 300 may determine when the content item 304 is displayed. For example, a content item 304 may be displayed prior to the playback of the media 302 (e.g., a pre-roll content item), during the playback of the media 302 (e.g., a mid-roll content item), and/or after the playback of the media 302 (e.g., a post-roll content item). In some implementations, the content item 304 may be shown during the playback of the media 302 when a specific frame of the media 302 displays an item relating to the content item 304. In other implementations, the content item 304 may be displayed at the beginning of a next media playback (e.g., between media in a playlist), while the playback of the media 302 is paused, and/or any other appropriate times.

Referring still to FIG. 3, the content item 304 is displayed to the right of the display of the media 302. In some implementations, the content item 304 may be displayed below the display of the media 302, as an overlay of the media 302, on a smaller scale than the media 302, and so forth. In some implementations, the content item 304 may initially appear on one side of the display of the media 302 and move during the playback of the media 302. In yet other implementations, the content item 304 may be minimized and displayed beneath the display of the media 302. For example, the content item 304 may be displayed for several seconds and then minimized while the media 302 continues playing.

While the foregoing has described the media 302 and the content item 304 displayed as part of a resource 300, the media 302 and content item 302 may be displayed using any appropriate form. For example, the media 302 and content item 304 may be displayed as part of an application executing on a client device, such as a media watching application executing on a mobile device.

Figure 4:
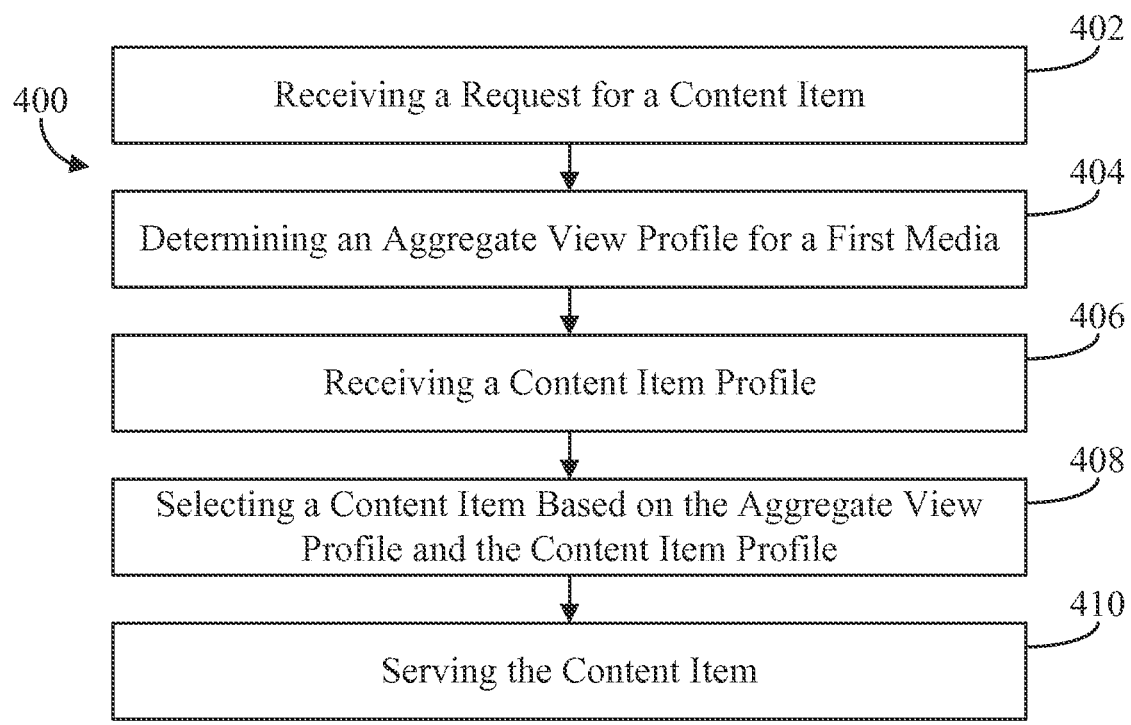
FIG. 4 is a flow diagram of an example process for providing a content item to a client device based on an aggregate view profile; according to an implementation.

FIG. 4 is a flow diagram of steps taking in an implementation of an example process 400 for providing a content item to a client device based on an aggregate view profile. Process 400 includes receiving a request for a content item (block 402). The request may be received by a content selection service of a server having one or more processors from a client device. The client device is any electronic device under the control of the user and is capable of receiving and requesting content over a network. The client device may include an application, such as a web browser, to facilitate providing and receiving content over a network, such as requesting video content from a website publisher. The request for the content item may be received by the content selection service, described above in FIG. 1.

A content item request that the content selection service may receive can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords of the content of the requested resource, text of the content of the resource, a title of the resource, a category of the resource, a type of the resource, etc.). The information that the content selection service receives can include a HyperText Transfer Protocol (HTTP) cookie which contains a device identifier (e.g., a random number) that represents the client device. In some implementations, the device information and/or the resource information may be appended to a content item request URL (e.g., //contentitem.item/page/contentitem?devid=abc123&devnfo=A34r0). In some implementations, the device information and/or the resource information may be encoded prior to being appended the content item request URL. The requesting device information and/or the resource information may be utilized by the content selection service to determine candidate third-party content items to be selected from and served to the client device.

In some implementations, the content item request may be transmitted responsive to a client device requesting a resource that includes a media item, such as media 302 of FIG. 3. In other implementations, the content item request may be transmitted responsive to the client device requesting data to effect presentation of the media (e.g., as part of a request for the media to be viewed using an application executing on the client device). In still further implementations, the content item request may be transmitted separate from a resource request or request data to effect presentation of the media (e.g., during playback of media, a content item request may be transmitted from the client device to the content selection service for a mid-roll content item). In some implementations, the content item request may also include data indicative of a current view profile, a media identifier, a number of views of the media, and/or a current time of a playback of the media.

In some implementations, the data indicative of a current view profile may be a numerical value indicative of a probable ratio of audio and video for the current view profile. That is, the current view profile may be a numerical value, such as 0.6, where a value of 0 is indicative of a predominantly audio-centric or audio-only profile and a value of 1 is indicative of a predominantly video-centric or video-only profile. Thus, an intermediate value, such as 0.6, may be indicative of a ratio of 60% video to 40% audio. Or, more simply, the current view profile of 0.6 may indicate that a user of the client device may be paying more attention to video than audio based on one or more parameters. The current view profile and such parameters will be described in greater detail herein. In other implementations, the data indicative of a current view profile may include the one or more parameters.

The media identifier may be a unique identifier (e.g., an alphanumeric sequence generated for each media) that is associated with the media to be played back or currently playing back on the client device. For example, media hosted by a content source may be associated with a unique media identifier generated by the content source such that the media hosted by the content source may be sorted, searched, retrieved, and/or otherwise organized and manipulated by the content source using the unique media identifiers.

The number of views of the media may be determined based upon the media identifier associated with the media to be played back or currently playing back on the client device. The number of views of the media may be determined based upon a device identifier profile associated with a device identifier of the client device and/or authentication credentials voluntarily provided by a user of the client device (e.g., by a user logging into a media hosting web site). In some implementations, such as when the content selection service and the media hosting content source may be in communication (e.g., a content selection service and a media hosting content source owned by the same entity or by access permitted by different entities), the number of views may be omitted from a content item request. In such an implementation, the number of views may be determined by the content selection service and/or the media hosting content source via the media identifier and a device identifier and/or authentication credentials voluntarily provided by the user of the client device.

The current time of the playback of the media may also be provided. The current time of the playback may be an exact time, such as a time stamp, or the current time of the playback may be a bucketized time (e.g., a playback time of 34 seconds may be categorized as between 30 seconds and 40 seconds). As will be describe in greater detail herein, the current time of the playback may be used to select a time-based aggregate view profile.

The current view profile, the media identifier, the number of views of the media, and/or a current time of a playback of the media may similarly be appended to the content item request URL and/or otherwise transmitted with the content item request to the content selection service.

The process 400 may further include determining an aggregate view profile for a first media (block 404). The aggregate view profile is indicative of how aggregate users interact with the media. For example, the users may interact with media by primarily listening to the media, by primarily viewing the media, or both listening and viewing the media. In some implementations, the aggregate view profile may be a numerical value, such as 0.6542, where a value of 0 is indicative of a predominantly audio-centric or audio-only profile and a value of 1 is indicative of a predominantly video-centric or video-only profile. Thus, an intermediate value, such as 0.6542, may be indicative of a ratio of 65.42% video to 34.58% audio. Or, more simply, the aggregate view profile of 0.6542 may indicate that users who view the media may be paying more attention to the video than the audio.

The aggregate view profile may be determined based on an aggregation of values indicative of a ratio of audio and video. Each value may be based on a previously received view profile. In some implementations, a data structure, such as an array, may be stored in a storage device of the content selection service and associated with a media identifier received with the request from the client device. The data structure may store the several values of previously received view profiles for the first media. Thus, when the request is received, the content selection service or another associated system may average the values to determine the aggregate view profile. When additional view data is to be added, the additional view profile value may be appended to the array of values. In other implementations, the data structure may simply include a value for the aggregate view profile, such as 0.6542, and a number of views, such as 1,405,786. When additional view data is to be added, the aggregate view profile and the number of views may be multiplied and the additional view profile value may be added to the resulting value, which is then divided by the incremented number of views to determine a new aggregate view profile value. The new aggregate view profile value and the incremented number of views may then be stored together for subsequent use. In some implementations, the aggregate view profile for the first media may simply be retrieved from the stored data structure.

In some implementations, the first media may include several aggregate view profiles. The different aggregate view profiles may be based on a number of views for a user of the client device received with the request and/or otherwise determined based on a device identifier and/or authentication credentials. The different aggregate view profiles may be separated into different categories, such as one view, two to five views, six to ten views, and ten or more views. Of course other bucketization of the categories may be used. Such different aggregate view profiles may be used as users' view profiles may change over the number of times the user has viewed the media. For example, a user who has viewed a music video media several times may no longer be playing back the media for the visual content of the music video; instead, the user may simply be playing back the media for the audio content. Accordingly, an aggregate view profile for such a music video media may be more audio-centric for views greater than ten, such as a value of 0.1345, but may be more equal for the aggregate view profile for a first view, such as a value of 0.5.

Further still, in some implementations the aggregate view profile may include several values along a playback time span of the media. For example, several aggregate view profile values may be determined for various time marks of the playback time span, such as at 10 seconds into playback, 15 seconds into playback, 20 seconds into playback, 30 seconds into playback, 40 seconds into playback, 45 seconds into playback, 50 seconds into playback, 60 seconds into playback, etc. The aggregate view profile for the various time marks may vary for the media. Using the example from before, a music video may have a more equally split aggregate view profile at a 30 second time mark, such as a value of 0.4891, but may be more audio-centric at the 60 second time mark, such as a value of 0.3333. Thus, such time-varying aggregate view profiles may reflect changes in how users interact with the media over time.

In some implementations, each time mark aggregate view profile may also be associated with a number of views for which a view profile was used to generate that time mark aggregate view profile. For example, many users may view a music video content item for the first thirty seconds, but may stop playback or switch to other media thereafter. Accordingly, such number of views may be used to weight the values of aggregate view profiles. Such weight may, for example, be used when averaging several different time mark aggregate view profiles. For instance, if a content item is to be shown during the first 30 seconds, then the weighted average of the aggregate view profiles for the 10 second time mark, the 20 second time mark, and the 30 second time mark may be used as the determined aggregate view profile.

In some implementations, metrics may be developed for the view-dependent and/or time-dependent aggregate view profiles to be provided to the content provider of the media (e.g., as tabular data in a report or a graphical data in a report, such as a line graph over the number of view of over the playback time frame). Of course, other analytic uses for such aggregate view profiles may be implemented as well.

The previously received view profiles may each be a numerical value indicative of a ratio of audio and video from a prior user of a client device viewing of the media. The previously received view profiles may be generated based on one or more parameters. The one or more parameters may include, for example, a parameter indicative of the orientation of a client device (e.g., an output from a gyroscope of a mobile device, such as mobile device 200 of FIG. 2), a parameter indicative of the motion, or lack thereof, of the client device (e.g., an output from an accelerometer of a mobile device, such as mobile device 200 of FIG. 2), a parameter indicative of a size of an interface for the media (i.e., indicating if the media is displayed fullscreen), a parameter indicative of the visibility of the application displaying the media (e.g., a window stack position, which may indicate if the media is behind other windows, and therefore more likely being played for audio content, or a parameter indicating the application is minimized), a parameter indicative of a volume level (e.g., whether the volume is zero or muted, which may indicate the media is likely being played only for the visual content), a parameter indicative of view profiles of associated media (e.g., media identifiers for other media in a playlist may be indicative of how the user interacts with the current media), and/or other parameters.

The parameter indicative of the orientation of a client device may be indicative of how a user of the client device is viewing a display of the device or not. For example, a user may place the device at a 0 degree or 180 degree angle, either face up or face down. Such an orientation may be indicative of a user not interacting with the video content and likely only interacting with the audio of the media. A user maintaining the device at a 45 degree angle (or anywhere between 30 and 60 degrees) may be indicative of a user watching content on a display of the device, thereby indicating that the user is interacting with the video content.

Similarly, the parameter indicative of the motion of the device may be indicative of whether a user of the client device is actively interacting with the device or not. For example, a user may set the device down and not move the device. Such lack of motion may be indicative of a user not interacting with the video content and likely only interacting with the audio of the media. A user actively moving and adjusting the device may be indicative of a user watching content on a display of the device, thereby indicating that the user is interacting with the video content.

The parameter indicative of a size of an interface for the media may be indicative of whether a user of the client device is predominately viewing the media or not. For example, a user may maximize the media (e.g., expand the display of the media to fullscreen). Such maximized viewing of the media may be indicative of a user interacting with the video content. Conversely, a minimizing of a size of the interface for the media may be indicative of a user not necessarily watching content on a display of the device, thereby indicating that the user is likely not interacting with the video content.

Similarly, the parameter indicative of a visibility of the application displaying the media may be indicative of whether a user of the client device is predominately viewing the media or not. For example, a window for the application may be in the back of a window stack. Such position of the window may be indicative of a user not interacting with the video content. In addition, a minimization of the window of the application may be indicative of a user not interacting with the video content. Conversely, having the window at the front of a window stack may be indicative of a user likely interacting with the video content.

The parameter indicative of the volume level (either for the client device or for the media) may be indicative of whether a user of the client device is predominately listening to the audio or not. For example, a user may set a volume level to zero or mute. Such low volume level may be indicative of a user predominantly interacting with the video content. In some implementations, a lack of change in the volume level may be indicative of a user interacting with the video content. A higher volume level may be indicative of a user interacting with the audio content.

Still a further parameter may include a parameter indicative of view profiles of associated media. For example, the media may be associated with other media via a playlist. In some implementations, the parameter may simply include media identifiers for other media in the playlist. The aggregate view profile for a second media may be indicative of how a user interacts with the current media. That is, if a second media in a playlist has an audio-centric aggregate view profile, the current media may likely also have an audio-centric view profile. Of course, the previously received view profiles may be based on other parameters.

In some implementations, the aggregate view profiles may not be utilized until a threshold number of previously received view profiles can be aggregated. For example, an aggregate view profile may not be used until at least 1000 previously received view profiles can be aggregated. Such a threshold value may reduce the likelihood of an erroneous aggregate view profile being utilized and serving a content item having a divergent content item profile.

Referring still to FIG. 4, process 400 includes receiving a content item profile (block 406). In some implementations, several content item profiles may be received for a set of candidate content items. The content item provider may specify a type of content item profile for the content selection system. For example, the content item provide may specify that an image content item, such as a banner advertisement, is image-only (e.g., a content item profile with a value of 1). The content item provider may specify that an audio content item is audio-only (e.g., a content item profile with a value of 0). Further still the content item provider may specify an intermediate value for an audio-visual content item. In some implementations, the content item provider may specify discrete intermediate values via inputting the value into a data entry field, by manipulating a slider, etc. For example, a content item provider may specify an audio-visual content item as having a content item profile with a value of 0.6 for a more visual than audio content item.

In come implementations, the content item profile may be determined based on a aggregate view profile of a second media associated with the content item. For example, an audio-visual content item (e.g., a video advertisement) may utilize media (e.g., the video) hosted by a media sharing website. Accordingly, the content item profile may be based on an aggregate view profile of the second media with which the content item is associated. In other implementations, the content item links to media hosted on such a media sharing website. Accordingly, the content item profile may be based on the aggregate view profile of the media of the landing page of the content item.

A content item may be selected based on the aggregate view profile and the content item profile (block 408). In some implementations a set of candidate content items may be eligible to be presented with media responsive to the request for a content item. The media may be tagged with a keyword and the set of candidate content items may be selected by the content selection service based on bidding on the keyword. The content selection service may then identify one or more content items based on an auction of the candidate content items. The content selection service may be configured to conduct a content auction among content item providers to determine which candidate content item is to be provided. The content selection service may use any number of factors to determine the winner of the auction. For example, the winner of a content auction may be based in part on the third-party provider's bid and/or a quality score for the third-party provider's content.

For example, the winner of a content item auction may be the content item having the highest value when a bid for the content item is multiplied by a quality score for the content item. That is, the content selection service may generate values for each candidate content item of several candidate content items using an equation, such as Value=Bid*QualityScore. In some implementations, the content selection service may utilize a variety of factors during the content item auction that may affect the quality score.

The quality score may be influenced by how well a candidate content item matches how a user will interact with the media. For example, a comparison between the candidate content item profile and the aggregate view profile may be performed. Such a comparison may simply be subtracting the content item profile from the aggregate view profile or vice versa. The larger the difference between the content item profile and the aggregate view profile, the less likely the candidate content item would fit being presented based on how users tend to interact with the media. The nearer the difference is to zero, the more likely the candidate content item would fit being presented based on how users tend to interact with the media. That is, if the media has an aggregate view profile having a value of 0.7, indicative of a view profile of 70% video and 30% audio, then the content selection service preferably serves a content item having a content item profile having a value of 0.7, indicative of a profile of 70% video and 30% audio. Of course, such a matching of the content item profile and the aggregate view profile may only be one factor affecting the quality score.

Content item profiles that diverge from the aggregate view profile for the media may have the quality score negatively impacted. That is, the comparison of the candidate content item profile and the aggregate view profile may be used to modify a quality score of the candidate content item. For example, an absolute value of the difference between the candidate content item profile and the aggregate view profile may be subtracted from a quality score. In some implementations, a weight factor may be applied. Such a weight factor may be determined via machine learning.

The process 400 further includes serving the selected content item responsive to the request from the client device. Serving the content item to the client device may include transmitting data to effect presentation of the selected content item by the content selection service, such as content selection service 104 of FIG. 1, to a client device and/or a content source via a network. The data for the content item may include graphical data, textual data, image data, audio data, video data, etc. that may be accessed from a database or other data store.

Selection of the content item may result in the client device transmitting a request for a landing page associated with the content item. The landing page may be displayed on the client device in a separate webpage from a webpage or application displaying the media or the landing page may replace the webpage displaying the media.

Figure 5:
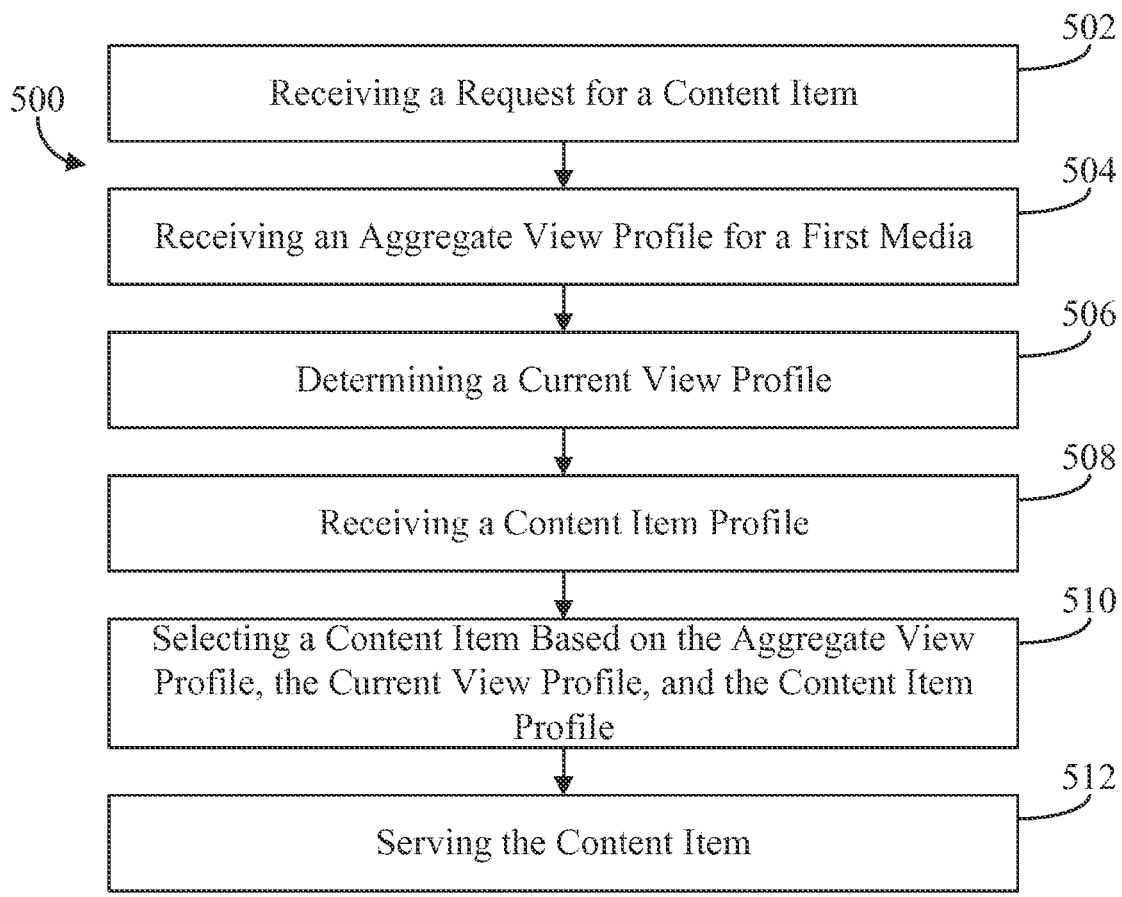
FIG. 5 is a flow diagram of another example process for providing a content item to a client device based on an aggregate view profile; according to an implementation.

FIG. 5 is a flow diagram of another example process for providing a content item to a client device based on an aggregate view profile. Process 500 includes receiving a request for a content item (block 502). The receiving of the request for a content item (block 502) may be performed in a substantially similar manner to the receiving of a request for a content item (block 402) described herein in reference to FIG. 4. Process 500 also includes receiving an aggregate view profile for a first media (block 504). The aggregate view profile is similar to the aggregate view profile described in reference to the determining of an aggregate view profile for a first media (block 404) described herein in reference to FIG. 4. The receiving of the aggregate view profile for a first media (block 504) may simply include receiving the value for an aggregate view profile, which may be received either based on a determination of the aggregate view profile by a content selection service and/or may be received from another system, which may be separate or independent of the content selection service.

The process 500 further includes determining a current view profile (block 506). In some implementations, the determining of the current view profile may simply be receiving a value for the current view profile from a client device. In other implementations, several parameters may be received from the client device and the content selection service may determine the current view profile based on the parameters. The value for the current view profile and/or the parameters may be received each time a content item request is sent to the content selection service.

The parameters for the current view profile may include a parameter indicative of the orientation of a client device (e.g., an output from a gyroscope of a mobile device, such as mobile device 200 of FIG. 2), a parameter indicative of the motion, or lack thereof, of the client device (e.g., an output from an accelerometer of a mobile device, such as mobile device 200 of FIG. 2), a parameter indicative of a size of an interface for the media (i.e., indicating if the media is displayed fullscreen), a parameter indicative of the visibility of the application displaying the media (e.g., a window stack position, which may indicate if the media is behind other windows, and therefore more likely being played for audio content, or a parameter indicating the application is minimized), a parameter indicative of a volume level (e.g., whether the volume is zero or muted, which may indicate the media is likely being played only for the visual content), a parameter indicative of view profiles of associated media (e.g., media identifiers for other media in a playlist may be indicative of how the user interacts with the current media), and/or other parameters. The parameters are described in greater detail herein.

In some implementations, the current view profile may be based on an average of the values for the parameters over a preceding predetermined period of time. For example, the values output from a gyroscope over the preceding 5 seconds may be averaged and the parameter indicative the orientation of a client device may be based on the average value. Similar averages may be applied to the other parameters. The predetermined period of time may include 1 second, 2 seconds, 5 seconds, 10 seconds, 15 seconds, 20 seconds, 30 seconds, etc.

The parameters may be used as inputs to an equation to determine a value for the current view profile. For example, the parameter indicative of the orientation of a client device, parameter indicative of the motion, or lack thereof, of the client device, parameter indicative of a size of an interface for the media, parameter indicative of the visibility of the application displaying the media, parameter indicative of a volume level, and/or the parameter indicative of view profiles of associated media may be input into an equation to determine a numerical value, such as 0.6, for the current view profile based on the parameters. In some implementations, the equation may be determined via machine learning (e.g., using a corpus of parameter data and corresponding data for the numerical values indicative of a ratio of audio and video).

In some implementations, the current view profile may be used by the content selection service to add to the aggregate view profile for a media for subsequent content item requests to present content items with the media associated with the aggregate view profile.

The process 500 further includes receiving a content item profile (block 508). The receiving a content item profile (block 508) may be performed in a substantially similar manner to the receiving a content item profile (block 406) described herein in reference to FIG. 4.

The process 500 also includes selecting a content item based on the aggregate view profile, the current view profile, and the content item profile (block 510). In some implementations a set of candidate content items may be eligible to be presented with media responsive to the request for a content item. The media may be tagged with a keyword and the set of candidate content items may be selected by the content selection service based on bidding on the keyword. The content selection service may then identify one or more content items based on an auction of the candidate content items. The content selection service may be configured to conduct a content auction among content item providers to determine which candidate content item is to be provided. The content selection service may use any number of factors to determine the winner of the auction. For example, the winner of a content auction may be based in part on the third-party provider's bid and/or a quality score for the third-party provider's content.

For example, the winner of a content item auction may be the content item having the highest value when a bid for the content item is multiplied by a quality score for the content item. That is, the content selection service may generate values for each candidate content item of several candidate content items using an equation, such as Value=Bid*QualityScore. In some implementations, the content selection service may utilize a variety of factors during the content item auction that may affect the quality score.

The quality score may be influenced by how well a candidate content item matches how a user will interact with the media. For example, a comparison between the candidate content item profile and the aggregate view profile may be performed. Such a comparison may simply be subtracting the content item profile from the aggregate view profile or vice versa. The larger the difference between the content item profile and the aggregate view profile, the less likely the candidate content item would fit being presented based on how users tend to interact with the media. The nearer the difference is to zero, the more likely the candidate content item would fit being presented based on how users tend to interact with the media. That is, if the media has an aggregate view profile having a value of 0.7, indicative of a view profile of 70% video and 30% audio, then the content selection service preferably serves a content item having a content item profile having a value of 0.7, indicative of a profile of 70% video and 30% audio.

Content item profiles that diverge from the aggregate view profile for the media may have the quality score negatively impacted. That is, the comparison of the candidate content item profile and the aggregate view profile may be used to modify a quality score of the candidate content item. For example, an absolute value of the difference between the candidate content item profile and the aggregate view profile may be subtracted from a quality score. In some implementations, a weight factor may be applied. Such a weight factor may be determined via machine learning.

In some implementations, a comparison between the candidate content item profile and the current view profile may be performed, either in addition to or in lieu of the comparison of the candidate content item profile and the aggregate view profile. Such a comparison may simply be subtracting the content item profile from the current view profile or vice versa. The larger the difference between the content item profile and the current view profile, the less likely the candidate content item would fit being presented based on how a user is currently interacting with the media. The nearer the difference is to zero, the more likely the candidate content item would fit being presented based on how a user is currently interacting with the media. That is, if current view profile has a value of 0.7, indicative of a current view profile of 70% video and 30% audio, then the content selection service preferably serves a content item having a content item profile having a value of 0.7, indicative of a profile of 70% video and 30% audio.

Content item profiles that diverge from the current view profile for the media may have the quality score negatively impacted. That is, the comparison of the candidate content item profile and the current view profile may be used to modify a quality score of the candidate content item. For example, an absolute value of the difference between the candidate content item profile and the current view profile may be subtracted from a quality score. In some implementations, a weight factor may be applied. Such a weight factor may be determined via machine learning.

In some implementations, an average of the current view profile and the aggregate view profile may be used prior to being compared to the content item profile. For example, a current view profile of 0.4 and an aggregate view profile of 0.6 may average out to 0.5, such that a content item having a content item profile of 0.5 would match the averaged value.

In other implementations, the current view profile and the aggregate view profile may be input into an equation to determine a combined value. That is, in some instances, it may be preferable to weight the current view profile more than the aggregate view profile or vice versa. Such an equation may be determined via machine learning. The combined value may be used as a modifier. The quality score for a candidate content item may then be modified based on the modifier and the content item profile for the candidate content item. For example, an absolute value of the difference between the candidate content item profile and the modifier may be subtracted from a quality score. In some implementations, a weight factor may be applied. Such a weight factor may be determined via machine learning.

In some implementations, an aggregate view profile may not exist and/or may not be above a threshold number of views to be used. Accordingly, the selection of the content item may be based on the current view profile and the content item profile. Accordingly, a comparison between the current view profile and the content item profile may be performed and used to modify the quality score for a candidate content item as described in greater detail herein.

The process 500 further includes serving the content item (block 512). The serving of the content item (block 512) may be performed in a substantially similar manner to the serving of the content item (block 410) described herein in reference to FIG. 4.

In some implementations, a second content item request may be received. The process 500 may then repeat using a new current view profile, either received with the second content item request and/or determined based on new parameters received from the client device.

Figure 6:
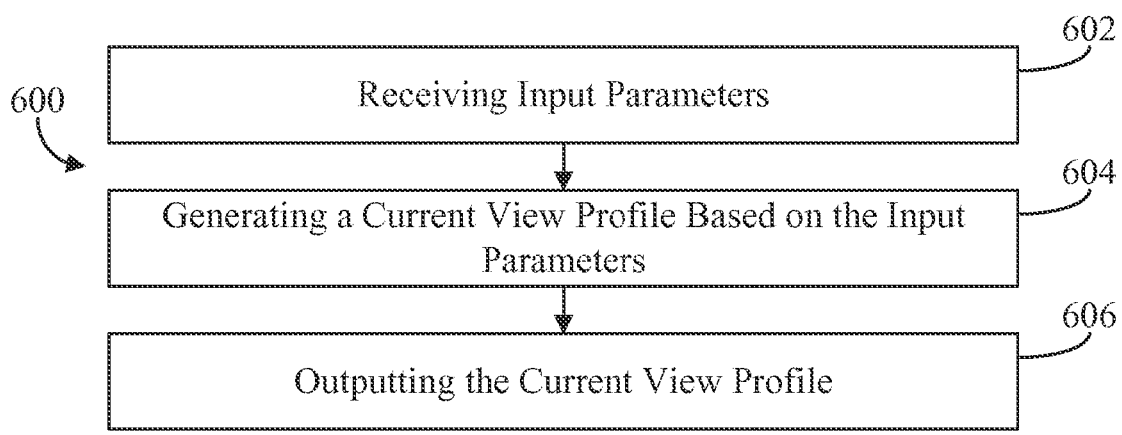
FIG. 6 is a flow diagram of an example process for generating a current view profile, according to an implementation.

FIG. 6 is a flow diagram of an example process for generating a current view profile. The process 600 may be performed by the client device and the current view profile may be outputted to a content selection service. The process 600 includes receiving input parameters (block 602). The parameters for the current view profile may include a parameter indicative of the orientation of a client device (e.g., an output from a gyroscope of a mobile device, such as mobile device 200 of FIG. 2), a parameter indicative of the motion, or lack thereof, of the client device (e.g., an output from an accelerometer of a mobile device, such as mobile device 200 of FIG. 2), a parameter indicative of a size of an interface for the media (i.e., indicating if the media is displayed fullscreen), a parameter indicative of the visibility of the application displaying the media (e.g., a window stack position, which may indicate if the media is behind other windows, and therefore more likely being played for audio content, or a parameter indicating the application is minimized), a parameter indicative of a volume level (e.g., whether the volume is zero or muted, which may indicate the media is likely being played only for the visual content), a parameter indicative of view profiles of associated media (e.g., media identifiers for other media in a playlist may be indicative of how the user interacts with the current media), and/or other parameters.

A current view profile may be generated based on the input parameters (block 604). The parameters may be used as inputs to an equation to determine a value for the current view profile. For example, the parameter indicative of the orientation of a client device, parameter indicative of the motion, or lack thereof, of the client device, parameter indicative of a size of an interface for the media, parameter indicative of the visibility of the application displaying the media, parameter indicative of a volume level, and/or the parameter indicative of view profiles of associated media may be input into an equation to determine a numerical value, such as 0.6, for the current view profile based on the parameters. In some implementations, the equation may be determined via machine learning (e.g., using a corpus of parameter data and corresponding data for the numerical values indicative of a ratio of audio and video). Data for the equation to determine the current view profile may be transmitted to a client device in response to a request for a content item.

In some implementations, the current view profile may be based on an average of the values for the parameters over a preceding predetermined period of time. For example, the values output from a gyroscope over the preceding 5 seconds may be averaged and the parameter indicative the orientation of a client device may be based on the average value. Similar averages may be applied to the other parameters. The predetermined period of time may include 1 second, 2 seconds, 5 seconds, 10 seconds, 15 seconds, 20 seconds, 30 seconds, etc.

The current view profile may be outputted (block 606). The outputting of the current view profile may simply include transmitting a numerical value, such as 0.6, representative of the current view profile to the content selection service. The content selection service may then use the current view profile to select and serve a content item for presentation with media to be played back by the client device, such as described in reference to FIG. 5.

In some implementations, the a device-specific view profile may also be generated based on prior view data associated with a device identifier and/or authentication credentials (e.g., a username and password) voluntarily provided by a user. The device-specific view profile may also include one or more interests of the user. The user may control the device-specific view profile, such as updating, modifying, and/or deleting the device-specific view profile. The user may also share the device-specific view profile on a social network. In some implementations, the device-specific view profile may be used by a content source, such as a media sharing website, to infer how a user of the device will interact with other media and store these inferences in the device-specific view profile. In some implementations, the device-specific view profile and/or the current view profile may be used by a content source, such as a media hosting website, to suggest other media to view.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method to serve online content based on a view profile comprising:
   providing, by one or more processors, a first media item for display at a plurality of client devices;
   receiving, by the one or more processors, from each client device of the plurality of client devices, a view profile indicative of a first likelihood that the first media item was consumed as audio or video at that client device, the view profile determined using sensor data of the client device obtained during presentation of the first media item on the client device;

generating, by the one or more processors, an aggregate view profile for the first media item based on the received plurality of view profiles from the plurality of client devices, the aggregate view profile indicative of a second likelihood of consuming the first media item as audio or video;

receiving, at the one or more processors, a request for content from a client device to present with the first media item;

receiving, by the one or more processors, a content profile for a content item in response to the request for content to present with the first media item, the content profile indicating a type of content of the content item, the type of content of the content item used for selection of the content item based on the aggregate view profile of the first media item;

comparing, by the one or more processors, the aggregate view profile of the first media item and the content profile of the content item; and serving, by the one or more processors, the content item, responsive to the request from the client device, based on the comparison of the aggregate view profile of the first media item and the content profile of the content item.

2. The method of claim 1, wherein, for each client device of the plurality of client devices, the view profile is indicative of client device interaction with the first media item.

3. The method of claim 1, wherein, for each client device of the plurality of client devices, the view profile is indicative of an orientation of the client device.

4. The method of claim 1, wherein, for each client device of the plurality of client devices, the view profile is indicative of a size of an interface for the first media item at the client device.

5. The method of claim 2, wherein, for each client device of the plurality of client devices, the view profile is indicative of motion of the client device.

6. The method of claim 2, wherein, for each client device of the plurality of client devices, the view profile is indicative of an audio volume level of the client device.

7. The method of claim 6, wherein the audio volume level is zero.

8. The method of claim 2, wherein, for each client device of the plurality of client devices, the view profile is generated based on an aggregate view profile of a second media item, the second media item and the first media item associated via a playlist.

9. The method of claim 1, wherein the type of content of the content item includes an indication of an audio-only content or a visual-only content.

10. A system comprising:
one or more processors; and
a storage device storing instructions that, when executed by the one or more processors, cause the one or more processors to perform operations comprising:
providing a first media item for display at a plurality of client devices;
receiving from each client device of the plurality of client devices, a view profile indicative of a first likelihood that the first media item was consumed as audio or video at that client device, the view profile determined using sensor data of the client device obtained during presentation of the first media item on the client device;
generating an aggregate view profile for the first media item based on the received plurality of view profiles from the plurality of client devices, the aggregate view profile indicative of a second likelihood of consuming the first media item as audio or video;
receiving a request for content from a client device to present with the first media item;
receiving a plurality of content item profiles for a plurality of candidate content items in response to the request for content to present with the first media item, each content profile indicating a type of content of the respective content item, the type of content of the content item used for selection of the content item based on the aggregate view profile of the first media item;
comparing the aggregate view profile of the first media item to each of the plurality of content profiles for the plurality of candidate content items;
selecting a candidate content item of the plurality of candidate content items based on the comparison of the aggregate view profile to each of the plurality of content item profiles; and
serving, responsive to the request from the client device, the selected candidate content item.

11. The system of claim 10, wherein, for each client device of the plurality of client devices, the view profile is indicative of client device interaction with the first media item.

12. The system of claim 10, wherein, for each client device of the plurality of client devices, the view profile is indicative of an audio volume level of the client device.

13. The system of claim 10, wherein the type of content of the content item includes an indication of an audio-only content or a visual-only content.

14. A computer-readable storage medium having machine instructions stored therein that when executed by one or more processors, cause the one or more processors to perform operations comprising:
providing a first media item for display at a plurality of client devices;
receiving from each client device of the plurality of client devices, a view profile indicative of a first likelihood that the first media item was consumed as audio or video at that client device, the view profile determined using sensor data of the client device obtained during presentation of the first media item on the client device;
generating an aggregate view profile for the first media item based on the received plurality of view profiles from the plurality of client devices, the aggregate view profile indicative of a second likelihood of consuming the first media item as audio or video;
receiving a request for content from a client device to present with the first media item;
receiving a content profile for a content item in response to the request for content to present with the first media item, the content profile indicating a type of content of the content item, the type of content of the content item used for selection of the content item based on the aggregate view profile of the first media item;
comparing the aggregate view profile of the first media item to each of the plurality of content profiles for the plurality of candidate content items; and
serving the content item, responsive to a request from the client device, based on the comparison of the aggregate view profile of the first media item and the content profile of the content item.

15. The computer-readable storage medium of claim 14, wherein the content profile is generated based on a second aggregate view profile of a second media item associated with the content item.

16. The computer-readable storage medium of claim 14, wherein the content profile is generated based on a content item provider selection.

17. The computer-readable storage medium of claim 14, wherein, for each client device of the plurality of client devices, the view profile is indicative of client device interaction with the first media item.

18. The computer-readable storage medium of claim 14, wherein the type of content of the content item includes an indication of an audio-only content or a visual-only content.

* * * * *